Figure 1:
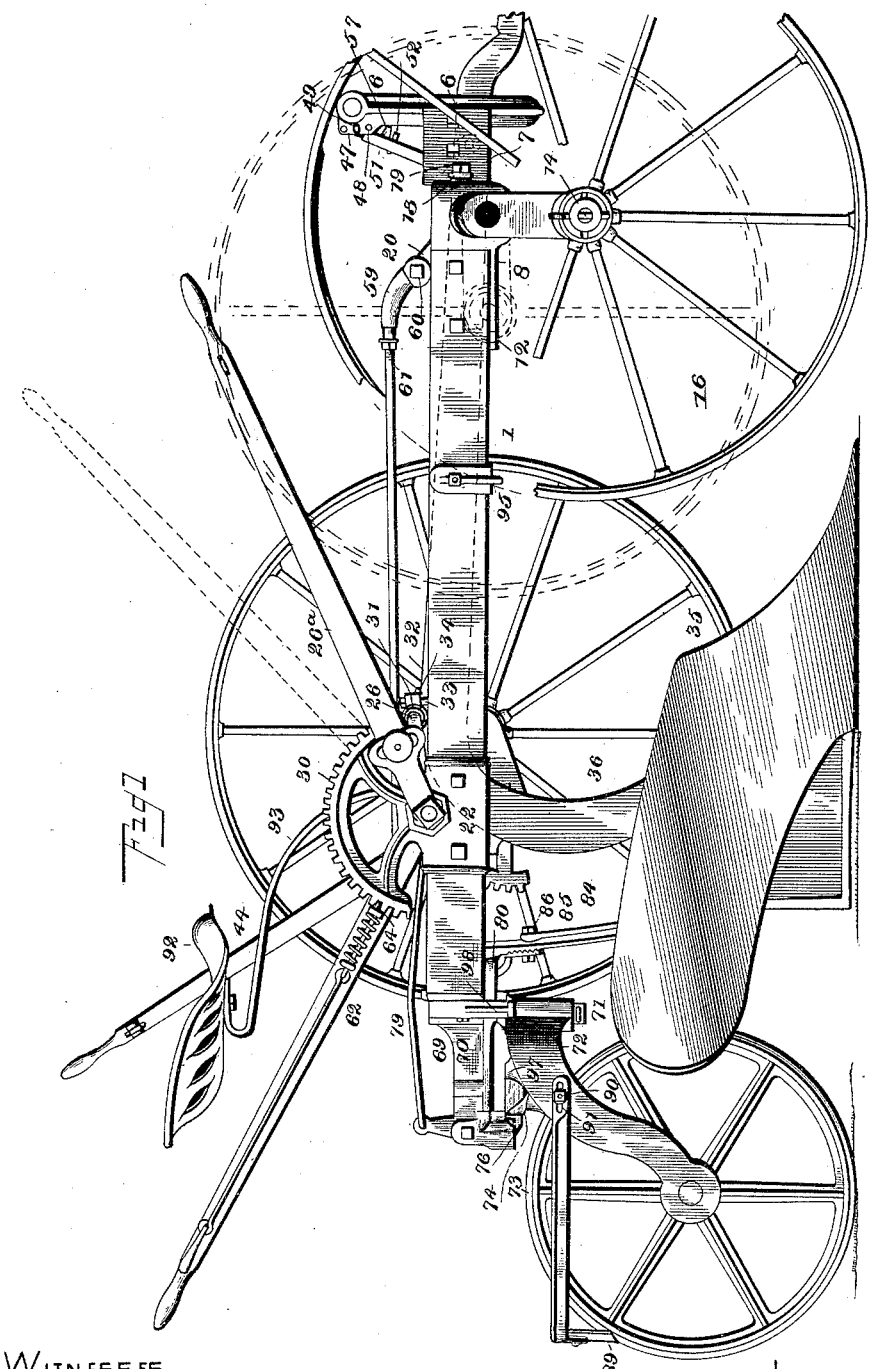

(No Model.) W. L. CASADAY. 4 Sheets—Sheet 1.
SULKY PLOW.

No. 466,945. Patented Jan. 12, 1892.

WITNESSES
John Amrie
G. M. Copenhaver

INVENTOR
William Lewis Casaday
Franck D. Johns
ATTORNEY

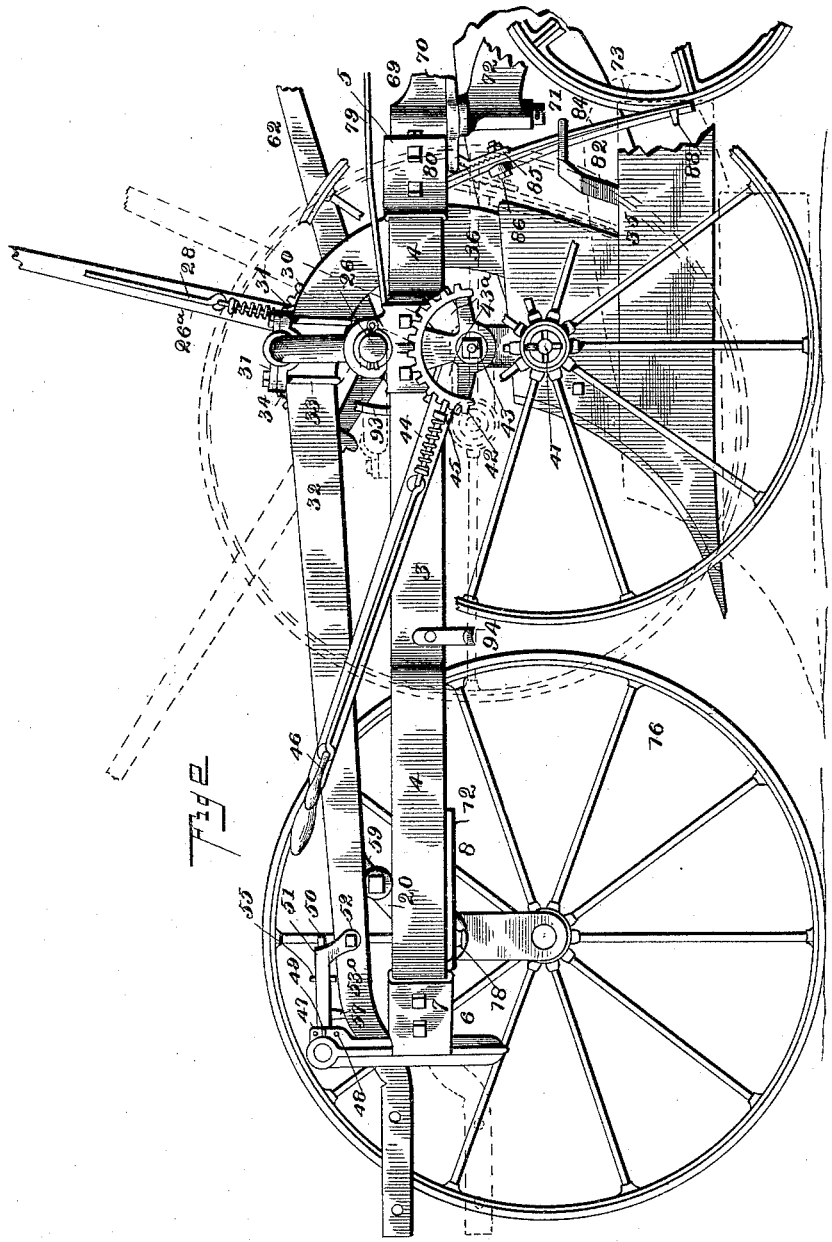

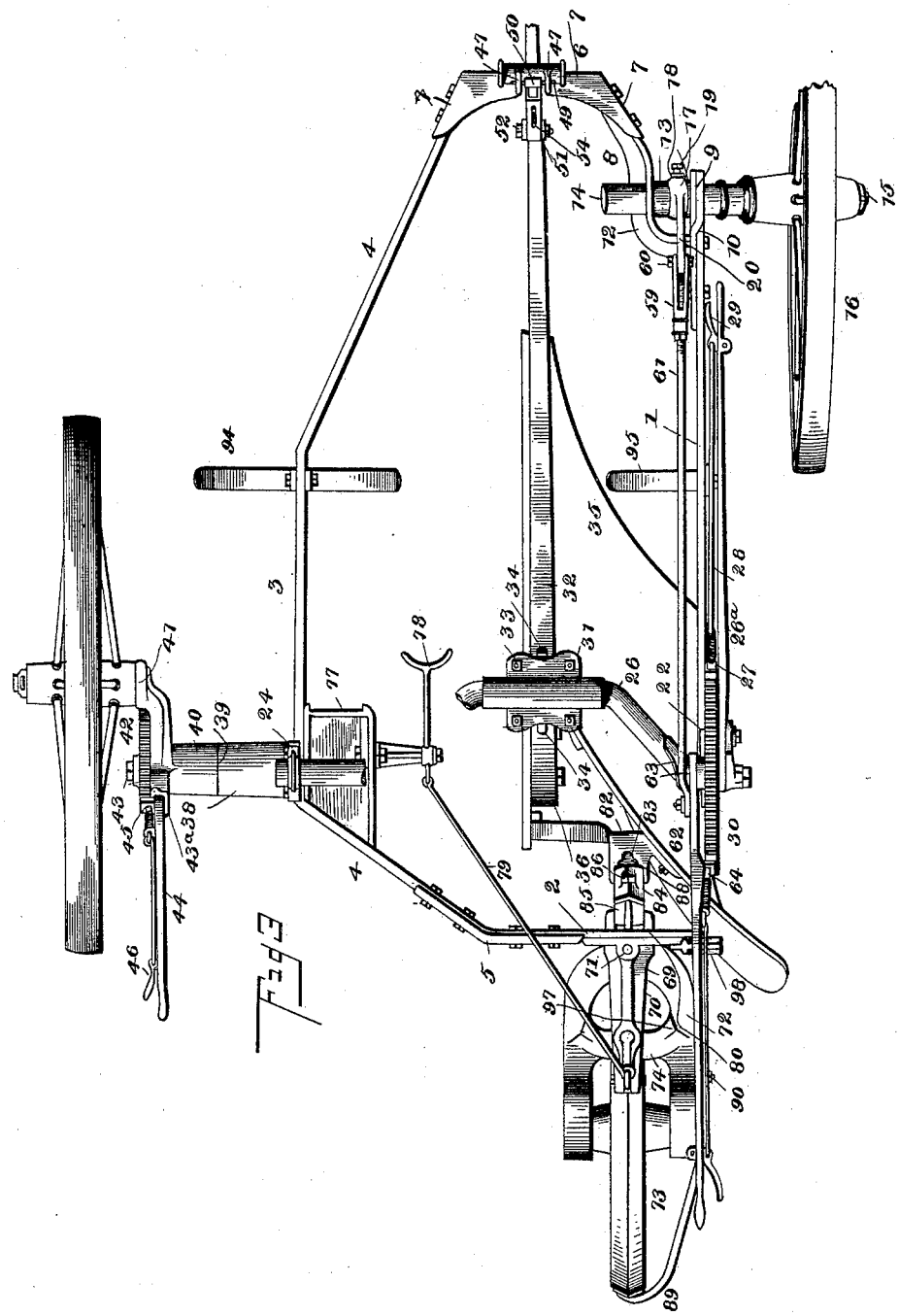

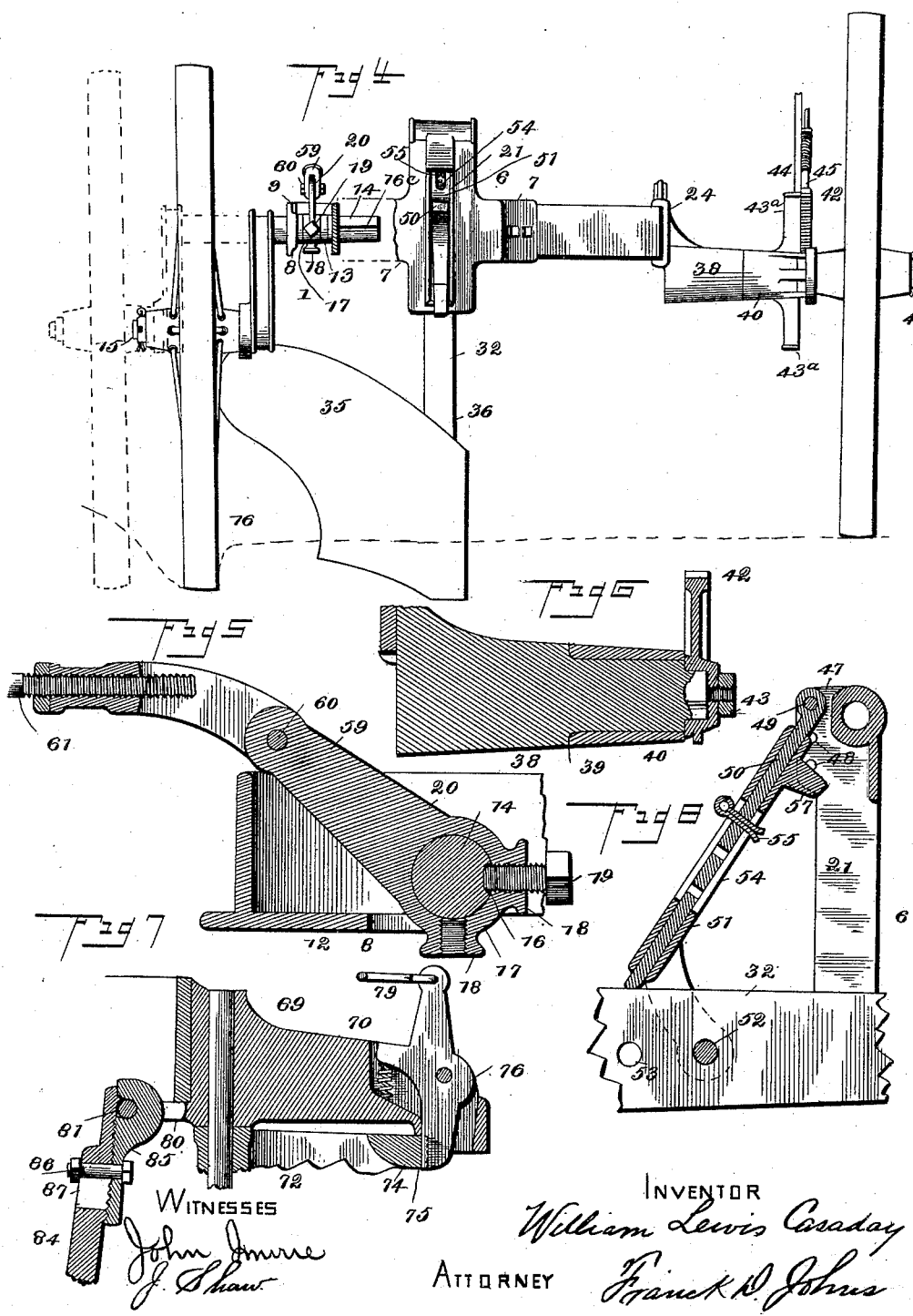

UNITED STATES PATENT OFFICE.

WILLIAM LEWIS CASADAY, OF SOUTH BEND, INDIANA.

SULKY-PLOW.

SPECIFICATION forming part of Letters Patent No. 466,945, dated January 12, 1892.

Application filed December 3, 1890. Serial No. 373,471. (No model.)

*To all whom it may concern:*

Be it known that I, WILLIAM LEWIS CASADAY, a citizen of the United States, residing at South Bend, in the county of St. Joseph and State of Indiana, have invented certain new and useful Improvements in Sulky-Plows; and I do hereby declare the following to be a full, clear, and exact description of the invention, such as will enable others skilled in the art to which it appertains to make and use the same.

This invention relates to certain improvements in what are known as "sulky-plows;" and it has for its objects to provide for regulating the width of furrows made by the plow, to give proper clearance between the forward furrow-wheel of the plow and the plowshare, to provide for raising or depressing the forward furrow-wheel when required, to prevent the furrow-wheel from becoming entangled with the doubletrees when turning, to enable the plow to have the desired movement in starting in the ground or pulling out from an obstruction, and also to hold the point of the plowshare down in the hardest ground and prevent it from running on its point or nose or out of the ground.

My invention further has for its objects to provide certain improvements in the construction of the furrow and landside parts of the frame of the plow and their connections with the operative mechanism thereof. The above-mentioned objects I attain by the means illustrated in the accompanying drawings, in which—

Figure 1 represents an elevation of the furrow side of the plow, dotted lines showing position of the furrow-wheel when elevated, the plow being shown in an operative position; Fig. 2, an elevation of the landside of the plow, the plow being shown elevated and in an inoperative position, the landside-wheel being down, dotted lines indicating the position of plow-landside when in an operative position. Fig. 3 represents a plan view of the plow. Fig. 4 is a front elevation of the plow, part of the frame being broken away and part of the operative mechanism being omitted. Figs. 5, 6, 7, and 8 are sectional details illustrating various parts of my said invention.

Referring to said drawings, the numeral 1 indicates the furrow-side portion of the frame of the plow, consisting of a flat bar, which is bent at right angles at its rear end, as indicated in Fig. 3, forming the rear portion 2 of the frame.

3 indicates the landside of the frame, which also consists of a flat bar having its ends 4 bent inwardly. The rear end of said bar and the rear portion 2 of the frame are connected by means of an angle-iron 5, so as to securely unite the sides and rear of the frame.

6 indicates a casting having lateral rearward extensions 7, which are provided with flanges at their upper and lower edges. The forward end of the landside-bar of the frame is bolted to one of said extensions, the said end setting between the flanges of said extension.

8 is a bifurcated casting or corner-bracket having a straight outer member 9, shouldered on its outer face at 10 and having an extended and inwardly-curved member 12. The outer member of the bifurcated casting or bracket is bolted to the landside-bar of the frame and the inner extended curved member of said casting is bolted to the other extension 7 of the casting 6 between the flanges thereof.

The parts above described constitute the frame of the machine.

13 are bearings formed in the members of the bifurcated casting or bracket 8, in which are mounted a crank-axle 14, on the crank end of which is formed the spindle 15 of the furrow-wheel 16, said wheel thus being located at the forward end of the furrow side of the frame. The said bearings are located in the same line, the outer bearing being slightly lower than the inner, so as to give an outward and downward inclination to the crank-axle and cause the said furrow-wheel to set at an angle to the wall of the furrow and rest close against the lower part of said furrow-wall.

The crank-axle 14 is provided with a longitudinal groove 16, and is held in place by a collar 17, surrounding said axle and located between the members of the bifurcated forward corner-bracket. Said collar is provided with two hollow internally-screw-threaded bosses 18, projecting from its periphery at right angles to each other, and in one of which is located a set-screw 19, the inner end of which engages and bears against the bottom of the groove in the crank-axle, so that the said axle may be moved laterally with relation to the frame and plow carried thereby and adjusted in order to regulate the width of the furrows, as hereinafter more fully set forth. The object of providing the collar with two hollow bosses is to enable said casting to be used either with a right or left hand plow. The collar 17 has also formed integral therewith a crank-arm 20, for a purpose hereinafter described. The casting 6 is provided with a vertical slot forming a yoke 21, through which extends the forward end of the plow-beam, the said beam being arranged to play vertically in said slot, for a purpose hereinafter explained.

22 indicates a plate secured to and projecting above the furrow side of the frame and having formed therein a bearing 23. 24 is a substantially similar plate secured to and projecting above the landside of said frame and having a bearing 25 formed therein at a point directly opposite the bearing 23.

26 indicates a crank-shaft having its ends mounted in the bearings 23 and 25. The furrow end of said shaft projects beyond its bearing 23 in the plate 22 and having secured thereto in any suitable manner a lever 26ª, by means of which the crank-shaft may be operated. Said lever is provided with a spring-actuated dog 27, connected by a link 28 with a hand-lever 29. Said dog is adapted to engage with a toothed segment 30, cast with the plate 22 and projecting above the frame of the plow. By means of said dog and segment the crank-shaft is locked at any desired point of adjustment.

31 is a bearing-block formed in two parts and mounted upon the crank portion of the shaft 26, said block being secured to the plow-beam 32 near its rear by means of suitable clips or bails 33, the said bearing-block resting between two small lugs or projections 34 on the beam. It will readily be seen that as the crank-shaft is operated by its lever the plow-beam is correspondingly raised or depressed to regulate its position and work of the plow.

35 indicates the plow, which may be of any usual or approved construction, and which is secured to the lower rear end of the beam. Said beam 32 is downwardly curved at its forward end 36, said forward end projecting and playing vertically through the yoke, as heretofore described, the curved end of the beam permitting it to be drawn up to an inoperative position.

38 is a shaft formed integral with and projecting at right angles from the plate 24, said shaft being shouldered at 39.

40 is a collar mounted upon the said shaft 38, its inner end resting against the shoulder 39.

41 is a crank-axle formed integral with the collar and carrying the landside-wheel. As the collar is turned, the said landside-wheel may be raised or lowered for the purpose hereinafter set forth.

42 is a toothed segment mounted and keyed upon the outer end of the shaft 38, which projects beyond the collar, said outer end being reduced in size and screw-threaded at 42. 43 is a suitable nut screwed thereon, said nut holding the segment and collar on the shaft. The said collar at its outer end is provided with radial projections 43ª, located at right angles to each other, which are recessed on their outer faces for the reception of a hand-lever 44, which is bolted in the recess of one of said projections. The object of providing the collar with two projections is to enable it to be interchangeable and used with either a right or left hand plow. The lever 44 is provided with a spring-dog 45, which engages the teeth of the segment, said dog being connected with a hand-lever 46 by a suitable rod. By means of said lever 44 the collar may be turned on its shaft, thus turning the crank-axle and raising or lowering the landside-wheel, as before mentioned.

The upper end of the forward vertically-slotted casting or yoke 21 is provided with parallel lugs 47, located on each of the vertical slots, having a series of oppositely-arranged apertures 48. Between the said lugs and upon a pin 49, which may be secured transversely in any two of the apertures above mentioned is pivoted the head of a plunger 50, forming one member of a telescopic connection between said yoke and the forward portion of the plow-beam, the other member of said connection consisting of sleeve 51, open at both ends and oversetting the plunger. The said sleeve member of the telescopic connection is bifurcated at its lower end so as to embrace the forward part of the plow-beam, and is pivotally secured thereto by means of a bolt or pin 52, mounted in one of a series of perforations 53 in said beam. The sleeve member of the telescopic connection in which the plunger works is provided with longitudinal slots 54 on its upper and under sides, and the plunger is provided with a pin 55, mounted in a hole in said plunger and setting in and adapted to move in said slots. The plunger may, if desired, be provided with two or more holes, so that the position of the pin may be shifted to regulate the play of said plunger. When the plow is lowered by means of the lifting-lever connected with the crank-shaft, the forward end of the beam moves down in the lower part of the yoke. The lower end of the plunger then projects through the lower end of the sleeve and engages with the upper end of the forward part of the plow-beam, holding the plow down to its work and preventing it from running out of the ground. Should the plow tend to run too deep or run on its point or nose, the pin in the plunger engages with the lower end of the slots and prevents its downward movement, thus automatically regulating the operation of the plow and holding said plow down in the hardest ground or preventing it from running too deep in soft ground and giving it the desired movement at the proper time when starting in the ground or pulling out from an obstruction. When the plow is raised and in an inoperative position, the telescopic connection rests substantially parallel with and upon the top of the beam, the sleeve portion of said telescopic connection being provided with a lug 57, which rests upon the top of the beam and operates to prevent breakage of either of the members of said connection. The forward end of said beam being curved enables it to be raised in the slot of the yoke.

By means of the series of holes in the lugs on the yoke and in the plow-beam both members of the telescopic connection between said parts may be adjusted, so that any desired pitch may be given to the plow. The frame of the plow, as will be readily seen, runs upon its wheel regardless of the height of the connection on the clevis.

The collar 17, secured to and holding the crank-axle of the furrow-wheel in place, is provided with a radially-projecting crank-lever arm 20. To said lever-arm is pivoted a curved casting 59, the connecting end being bifurcated, so as to embrace the arm, the connection being made by means of a bolt 60. The rear of said casting has a longitudinal bore, which is internally screw-threaded for the reception of the screw-threaded rod 61, which connects pivotally with a lever 62, fulcrumed upon the furrow-side end of the crank-shaft, carrying the plow-beam on the inner side of its furrow-side journal-bearing. Said lever is held in place by a suitable collar, and washers 63, also mounted upon the crank-shaft. This lever is similar in construction to the lifting or operating lever of the crank-shaft and is provided with a spring-dog 64, which engages with the same toothed segment that the dog of the lifting-lever engages. This construction and arrangement of the levers so as to engage the same toothed segment is for the purpose of economy and simplicity of construction. By means of this lever the crank-axle carrying the furrow-wheel is operated so as to raise or lower said wheel, the screw-threaded connection between the lever-arm of the collar and operating-lever enabling the parts to be adjusted properly for hard or soft ground, as hereinafter more fully explained.

69 is a casting bolted to the rear of the frame and provided with a projecting arm 70, extending at right angles to said rear portion and in a line parallel with the sides thereof.

71 is a downwardly-projecting pintle secured to the casting at its junction with the frame, and upon which pintle is mounted the yoke 72 of a rear caster-wheel 73. Said yoke is provided with a horizontal segmental cross-bar 74, in the center of which is formed a locking-notch 75.

76 is a spring-actuated locking-bolt pivoted in the rear of the arm 70, which normally engages the locking-notch and holds the caster-wheel in a line with the furrow and landside-wheels when the plow is running in a direct line.

77 is a tool-box secured to the landside of the frame.

78 is a crank-foot lever pivoted to a short arm bolted to the inner side of the tool-box, the crank of said lever being connected to the pivoted locking-bolt 76 by a link or rod 79. By means of this lever the locking-bolt may be released from the locking-notch 75 to permit the caster-wheel to turn upon its pintle when the plow is turning corners. As before stated, the caster-wheel is normally held locked.

80 are lugs formed integral with the casting 69 and extending under and in front of the rear of the frame. Said lugs are connected by a bearing 81.

Secured by means of bolts or otherwise between the mold-board and landside of the plow is a bracket 82, which is slotted at 83, and through said slot passes and plays a brake-lever 84, which is angular in cross-section to bear closely against the angular periphery of the caster-wheel when said lever is thrown back. The slot in the bracket conforms to the cross-section of the lever. The upper end of the lever on its concave face is corrugated and rests against a similarly-corrugated face of a metallic block 85, the corrugated surface of which is made convexly angular, so as to fit the concave angular portion of the brake-lever and make a firm connection. The block 85 is loosely mounted on the bearing 81, and the lever is secured to said block by means of a suitable bolt and nut 86, thus pivotally securing the lever to the bearing. Said block is provided with a longitudinal slot 87, through which the bolt 86 passes, whereby the lever can be shortened or lengthened, for a purpose hereinafter set forth.

The brake-bar is provided with a lug 88 on its lower end, upon which the bracket rests when the plow is in operation. By shortening or lengthening the lever, as above stated, the heel of the landside is held at any adjustment to give the proper pitch to the point of the plow, and thus prevent any riding friction on the bottom of the landside.

89 is a scraper adjustably secured to the yoke of the caster-wheel by means of a bolt 90, passing through a slot 91 in the forward end of the supporting-arm of the scraper.

The driver's seat 92 is supported upon a suitable arm 93, which, for convenience, is bolted to the tool-box. This also enables the plow to be better balanced when plowing upon side hills.

94 is a double foot-rest bolted to the landside of the frame, and 95 a foot-rest bolted to the furrow side of said frame.

97 are shoulders formed at each side of the yoke, the furrow-side shoulder being adapted to engage a stop 98 bolted to the bracket, and thus prevent the yoke of the caster-wheel from striking the mold-board of the plow when turning.

The operation of my said invention is as follows: The brake-lever, with the lower lug of which the bracket engages, and the telescopic connection between the plow-beam and yoke are first adjusted to give the desired pitch to the point of the plow. The crank-axle of the forward furrow-wheel is adjusted to regulate the width of the furrow, the distance between the line of travel of said wheel and the landside of said plow determining the width of the furrow as said wheel travels close to the wall of the last furrow. In opening the first furrow the furrow and landside wheels are both raised the desired height to regulate the depth of the furrow. By means of the crank-shaft lever said crank-shaft is turned forward, lowering the plow-point first, causing said plow to enter the ground with its point at a downward inclination, the proper inclination of plow-point being maintained by the telescopic connection either in hard or soft ground, the lug on the lower end of the brake-bar preventing any riding friction on the landside. After the first furrow is opened the forward furrow-wheel is lowered and runs in the bottom of said furrow in a plane with the bottom of the plow and close against the wall of the landside. In turning the plow in or back furrowing the furrow-wheel is raised sufficiently to plow the same depth at the corner. When turning, the wheel being raised off the ground, all strain is taken off the wheel and its axle, the plow turning on its own bottom, the caster-wheel having been previously unlocked by means of the foot-lever. Further, when turning, the furrow-wheel being drawn back when raised, it is prevented from becoming entangled with the doubletrees. When necessary in plowing hard ground, the furrow-wheel may be raised, the entire weight of said wheel, axle, and forward part of the frame being transmitted through the plunger to the plow-beam, and thus force the forward end of the plow into the ground. When drawing out from an obstruction or raising the plow, the heel of said plow raises first until the brake-bar engages with the caster-wheel, when the bracket surrounding the brake-bar becomes the pivot upon which the front end of the beam is raised. The brake-bar prevents the plow from running upon the horses when going down grade and the plow is out of operation.

Having thus fully described my invention, what I claim as new, and desire to secure by Letters Patent, is—

1. In a sulky-plow, the combination, with a frame carrying a plow, of a crank-axle mounted in bearings in the forward portion of the furrow side of said frame and carrying a furrow-wheel, a collar surrounding said crank-axle and provided with a set-screw engaging the axle, a crank-arm projecting from said collar, an internally-screw-threaded casting pivoted to said arm, an operating-lever, and a connecting-rod pivoted to said operating-lever and having a screw-threaded connection with screw-threaded casting, whereby the connection between the lever and crank-axle may be adjusted to regulate the throw of the crank-axle, all constructed, arranged, and operating substantially as shown and described, for the purposes specified.

2. In a sulky-plow, the combination, with a frame carrying a plow and a bifurcated casting or bracket secured to and forming a part of the forward end of the furrow side of the frame, of a crank-axle mounted in bearings in the members of said bifurcated casting and carrying a furrow-wheel, a longitudinal groove formed in the axle, a collar surrounding said axle and provided with a set-screw engaging the groove, and mechanism for operating said crank-axle, all constructed, arranged, and operating substantially as shown and described, for the purpose specified.

3. In a sulky-plow, the combination, with a frame, a crank-shaft mounted on said frame, and a plow-beam pivotally secured to said crank-shaft and carrying a plow, of a pivotal telescopic connection between the forward end of the beam and forward end of the frame, substantially as shown and described, for the purpose specified.

4. In a sulky-plow, the combination, with a frame and a crank-shaft mounted on said frame and carrying a plow, of a telescopic connection between the forward end of the plow, consisting of the sleeve member adjustably pivoted to the beam and the plunger member adjustably pivoted to the frame and working in the sleeve member, all constructed, arranged, and operating substantially as shown and described.

5. In a sulky-plow, the combination, with a frame, a yoke on the forward end of said frame, a crank-shaft mounted on the frame, and a plow-beam pivotally secured to said yoke and having its forward end passing through and working in the yoke, of a telescopic connection between the upper portion of the yoke and the forward end of the plow-beam, consisting of a sleeve member adjustably pivoted to the beam and a plunger member adjustably pivoted to the yoke, all constructed, arranged, and operating substantially as shown and described, whereby the plow-beam and plow are automatically regulated and the point of the plow prevented from running too deep or out of the ground.

6. In a sulky-plow, the combination, with a frame, a yoke on the forward end of said frame, a crank-shaft mounted on said frame, and a plow-beam pivotally secured to said shaft and having its forward end passing through the yoke, of a telescopic connection between the beam and yoke, consisting of a sleeve member adjustably pivoted to the beam and having slots in its upper and lower sides, and a plunger member adjustably pivoted to the top of the yoke, said plunger working in the sleeve and adapted to engage the top of the plow-beam near its forward end and being provided with a pin working in the slots of the sleeve adapted to engage one end of the slots thereof, all constructed, arranged, and operating substantially as shown and described, for the purpose specified.

7. In a sulky-plow, the combination, with the frame, the crank-shaft, and plow-beam and plow carried thereby, of the yoke in the forward end of the frame, the parallel lugs on each side of the slot of said yoke, having a series of oppositely-disposed apertures in each lug, the series of apertures in the beam, the telescopic connection between said beam and yoke, consisting of the plunger pivoted to the yoke by means of a pin passing through any two of the opposite apertures in the lugs, and the sleeve pivoted to the frame by a pin mounted in any of the apertures in said beam, all constructed, arranged, and operating substantially as shown and described.

8. In a sulky-plow, the combination, with the frame, the plow-beam and plow, and the slotted bracket secured to the rear of said plow, of the adjustable pivoted brake-bar adapted to bear against the rear wheel and having on its lower end a lug, with which the bracket engages when the plow is in operation to regulate the pitch of the plow and prevent any riding friction of the bottom of the landside, all constructed, arranged, and operating substantially as shown and described.

9. In a sulky-plow, the combination, with the frame, of the plow-beam and plow, the bearing secured to the rear of the frame, the corrugated slotted block mounted upon said bearing, and the brake-lever having a corrugated upper face and adjustably secured to said block by a suitable bolt, substantially as shown and described.

10. The combination, in a sulky-plow, of the rear caster-wheel yoke having a segment provided with a locking-recess, the casting to which said wheel is swiveled, and the spring locking-lever, and connecting rod and lever whereby said caster-wheel is locked or unlocked, substantially as shown and described.

11. In a sulky-plow, the combination, with a frame and a crank-shaft mounted on said frame and carrying a plow, of a telescopic connection between the forward end of the plow-beam, consisting of an adjustably-pivoted sleeve-bar and an adjustably-pivoted plunger working in the sleeve-bar, substantially as shown and described, and for the purpose specified.

In testimony whereof I affix my signature in presence of two witnesses.

WILLIAM LEWIS CASADAY.

Witnesses:
A. D. BAKER,
P. J. PIXLEY.